M. C. BOGIA.
Culinary Apparatus.

No. 164,255. Patented June 8, 1875.

Witnesses.
N. E. Lehman
Millard F. Walton

Inventor.
Matthew C. Bogia
by John A. Wiedersheim & Co.
Attys.

THE GRAPHIC CO. PHOTO-LITH. 39 & 41 PARK PLACE, N.Y.

UNITED STATES PATENT OFFICE.

MATTHEW C. BOGIA, OF PHILADELPHIA, PENNSYLVANIA.

IMPROVEMENT IN CULINARY APPARATUS.

Specification forming part of Letters Patent No. 164,255, dated June 8, 1875; application filed September 16, 1873.

*To all whom it may concern:*

Be it known that I, MATTHEW C. BOGIA, of the city and county of Philadelphia and State of Pennsylvania, have invented a new and useful Culinary Apparatus; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1:
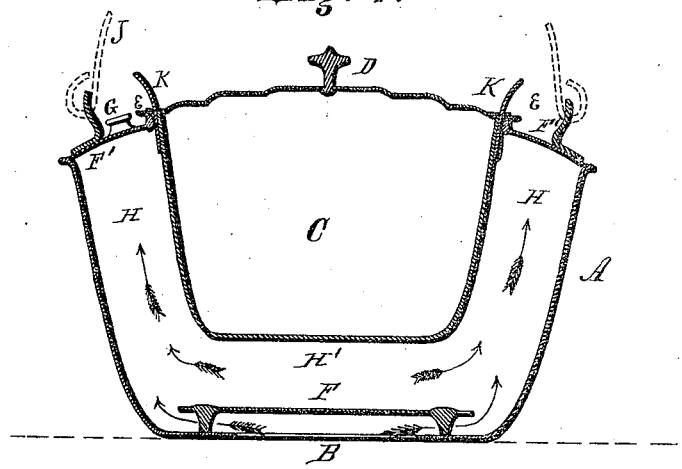
Figure 2:
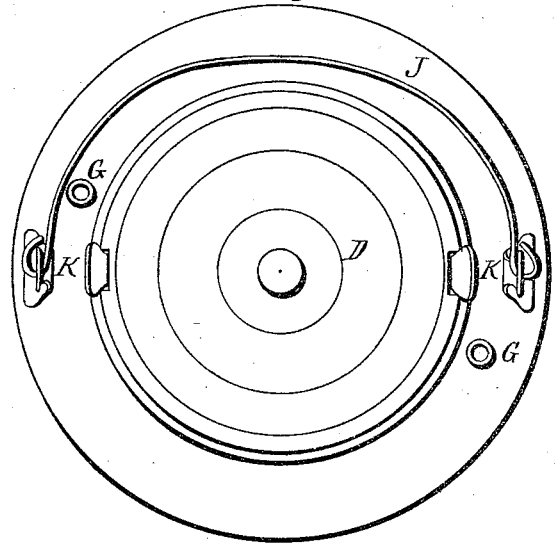

Figure 1 is a central vertical section of the device embodying my invention. Fig. 2 is a top or plan view thereof.

Similar letters of reference indicate corresponding parts in the two figures.

This invention relates to an apparatus designed for baking and cooking without danger of burning the article of food; and it consists of an exterior pot having an opening in its bottom on which the apparatus rests, a closed vessel or pan suspended therein, and a deflector arranged in the exterior pot below the closed bottom of the interior pan, and elevated above the opening in the bottom of the exterior pot.

A damper is arranged in the ledge on which the closed vessel is suspended, so as to regulate the heat in the space between the exterior pot and interior vessels.

Referring to the drawings, A represents a pot or vessel having an opening, B, in its bottom. C represents a pan, which is adapted to be suspended within the pot A by means of a flange, E, formed on the upper portion of the pan C, and resting on a ledge, F', at the top of the pot A, so that space H H' is left between the pan and pot, which space, when the parts are together, is closed above, and access is had thereto from below through the opening B in the bottom of the pot. F represents a deflector-plate, which is secured to the bottom of the pot A, and elevated above the open bottom thereof, so that the plate surmounts the opening B, and the latter is not closed, the plate projecting over the edges of said opening.

In practice, the various parts will be preferably made of cast metal.

The operation is as follows: The apparatus is placed over the fire of a furnace, stove, or elsewhere, and the heat thereof passes through the opening B, and is deflected by the plate F toward the sides of the pot A, and fills the space H. The space H' is also filled with heat, a portion of which radiates through the plate F, so that as the heat is admitted into the apparatus it does not pass directly to the bottom of the pan C, so as to endanger the contents thereof by burning, but is diffused equally throughout the spaces H H', and thus acts uniformly on the pan C, and correspondingly on the article placed therein to be baked or cooked.

In the ledge F', there is arranged a damper, G, which thus occupies a position at the top of the apparatus, and communicates with the space H' for regulating the heat therein, thus uniformily acting on the food, and insuring safety from burning of the contents of the interior pan C.

A bail, J, is secured to the pot A for convenient handling thereof, and handles K are attached to the pan C for ready application of the pan to the pot, and its removal therefrom.

I am aware that deflectors have been placed at the bottom of certain culinary apparatus, and I am also aware that an exterior pot and a vessel suspended therein are not new. Therefore, I disclaim them; but What I do claim as new, and desire to secure by Letters Patent, is—

The exterior pot A, with ledge F' on top, and opening B in bottom, the interior closed pan C suspended from the ledge F', the deflector F, between the open bottom of the pot A, and closed bottom of the pan C, and the damper G in the ledge F', all constructed, combined, and operating substantially as and for the purpose set forth.

MATTHEW C. BOGIA.

Witnesses:
JOHN A. WIEDERSHEIM,
JNO. A. BELL.